June 2, 1931. D. J. ANGUS 1,808,334

VOLT AMPERE METER

Filed Nov. 4, 1927

Inventor

DONALD J. ANGUS,

By Ashley Frask

Attorneys

Patented June 2, 1931

1,808,334

UNITED STATES PATENT OFFICE

DONALD J. ANGUS, OF INDIANAPOLIS, INDIANA

VOLT-AMPERE METER

Application filed November 4, 1927. Serial No. 230,949.

It is the object of my present invention to measure the volt-amperes of an alternating current circuit; and to do so by a simple and reliable process and apparatus requiring no special construction of the meter itself to eliminate the power factor and making it possible for an ordinary direct-current wattmeter to give a correct measurement of such alternating current volt-amperes.

In carrying out my invention, I derive separate voltage-proportional and current-proportional alternating currents from the alternating-current circuit whose volt-amperes are to be measured, in any usual manner of deriving such currents. I rectify these two derived currents separately, and thus obtain two unidirectional currents proportional respectively to the voltage and to the current of the main alternating current circuit. I preferably obtain this rectification by static means, such as suitable rectifying units or cells. But these two unidirectional currents are both still violently pulsating from zero to maximum and back to zero each half-cycle, and the phase relationship between them is still dependent on the power factor of the main circuit. To eliminate such dependence, I provide an electric filter for at least one of such currents, or for each of them if desired. Such electric filter eliminates the half-cycle or intra-cycle fluctuations or pulsations of the current upon which it acts, and smoothes out such current into a steady current. The two currents, one or both of which have been thus smoothed out into steadiness, are supplied to the voltage and current windings respectively of any type of direct-current wattmeter, and there react to produce the proper reading or record. This reading or record—for the direct-current wattmeter may be either indicating or recording—is a true showing of the volt-amperes of the main alternating current circuit. That is, the power factor is eliminated, because the current in at least one of the meter windings is a steady current whose value at any instant is substantially independent of intra-cycle variations; so that the two currents supplied to the wattmeter windings, even if only one of such currents has been made steady by passing through an electric filter, react in the same manner independently of the phase relationship between the voltage and the current in the main alternating current circuit.

Figure 1:
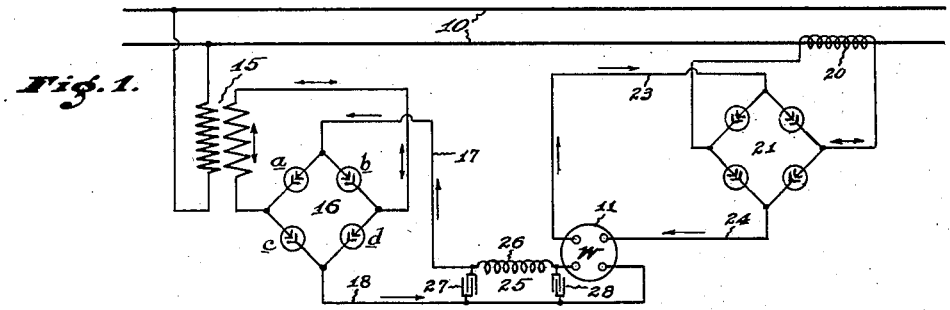
Figure 2:
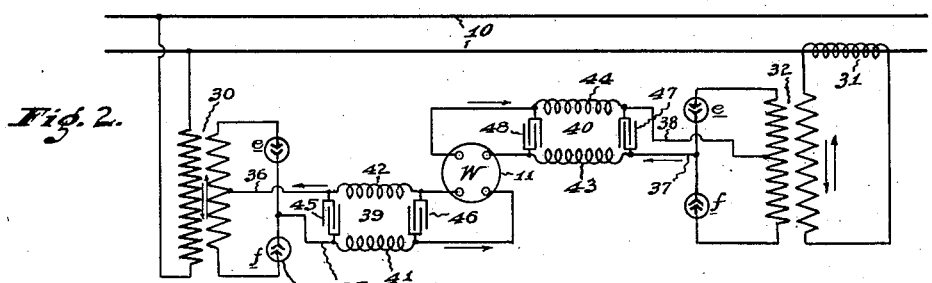

The accompanying drawings illustrate my invention diagrammatically: Figs. 1 and 2 are connection diagrams of two forms of my invention; and Figs. 3 and 4 are current diagrams for Figs. 1 and 2 respectively, showing the types of currents in the various parts of the meter-supplying circuits thereof.

The main circuit 10 shown in each of Figs. 1 and 2 is the alternating-current circuit whose volt-amperes are to be measured, and the direct-current wattmeter 11 is the meter by which such measuring is done. The wattmeter 11 may be any type of direct-current wattmeter, either indicating or recording.

The current and voltage windings of the wattmeter 11 are supplied with unidirectional currents proportional to the current and to the voltage respectively of the alternating current circuit 10; and at least one of such unidirectional currents is smoothed out into a steady current substantially free from intracycle variations or pulsations.

In the arrangement shown in Fig. 1, the wattmeter voltage connection is by a transformer 15 which has its primary connected across the main circuit 10. The terminals of the secondary of the transformer 15 are connected to two points of a four-group set of suitable rectifying cells 16, (well known per se), which set has two other connection points connected to the wires 17 and 18 to supply them with unidirectional current. This four-group set of rectifying cells 16 is one well-known arrangement of rectifying cells, (another well-known arrangement being the two-group set shown in Fig. 2,) and consists of the four groups $a$, $b$, $c$, and $d$ of rectifying cells each sufficient in number for the applied voltage. These four groups are connected in a rectangle, with the wires 17 and 18 connected to the set at the junction points between the groups *a* and *b* and between the groups *c* and *d*, and with the terminals of the secondary of the transformer 15 connected to the junction points between the groups *a* and *c* and between the groups *b* and *d*. The four groups of cells are arranged to permit current flow from the junction point of the groups *a* and *b* through either of those groups, and to the junction point of the groups *c* and *d* through either of those groups. In consequence, current flow toward the junction points between the groups *a* and *c*, and between the groups *b* and *d*, can be only by the groups *a* and *b*, and current flow away from those junction points can only be through the groups *c* and *d*. These directions of current flow in the four groups of cells are indicated by arrows.

Because of this arrangement, it is apparent, during one half-cycle the current flow is downward through the secondary of the transformer 15, then through the cell-group *c* to the wire 18, then through any intervening connections (to be described below) to the wire 17, and then through the cell-group *b* to the upper end of said transformer secondary; and during the other half-cycle the current flow is upward through said transformer secondary, then through the cell-group *d* to the wire 18, then through such intervening connections as before to the wire 17, and then through the cell-group *a* to the lower end of said transformer secondary. Thus the current flow on both the half-cycles is from the wire 18 to the wire 17, so that such current flow between those two wires and through the intervening connections is unidirectional.

The wattmeter current connection shown in Fig. 1 is by a current transformer 20 having the usual connection to the main circuit 10. The terminals of the secondary of this current transformer 20 are connected to a four-group set of suitable rectifying cells 21, which is also connected to two wires 23 and 24 to supply them with unidirectional current. The connections for the set 21 are in general analogous to those for the set 16.

Thus the wires 17 and 18 carry a unidirectional current proportional to the voltage of the main alternating-current circuit 10, and the wires 23 and 24 carry a unidirectional current proportional to the current in such main alternating current circuit. So these two pairs of wires are connected to the voltage winding and to the current winding respectively of the direct current wattmeter 11.

To get proper reaction between such two windings of the direct-current wattmeter, free from the power factor of the main circuit, the current supplied to at least one of such currents must be smoothed out. This may be done by an electric filter, which per se is well known. In Fig. 1 I show such an electric filter 25 in the voltage circuit, in connection with the wires 17 and 18. (In Fig. 2, however, such an electric filter is shown in connection with each of the two circuits leading to the wattmeter.)

The type of electric filter 25 shown in Fig. 1 consists of a reactance 26 connected in one of the wires 17 and 18—in the wire 17 as shown—and two condensers 27 and 28 between the wire 18 and the two ends respectively of the reactance 26.

With this arrangement of circuits, the voltage winding of the direct-current wattemeter 11 carries a underictional current which is substantially proportional to the voltage of the main circuit 10 and is substantially free from intra-cycle pulsations; and the current winding of such wattmeter carries a undirectional current which is substantially proportional to the current of main circuit but pulses with the half-cycles of said main-circuit current. Because one of these currents supplied to the wattmeter is thus free from intra-cycle pulsations, the two currents react in the wattmeter independently of the power factor of the main circuit, and thus give a true volt-ampere measurement.

In Fig. 3 I have indicated diagrammatically the types of current in the various parts of the wattmeter-supplying circuits of the arrangement shown in Fig. 1. To this end, Fig. 3 is placed directly beneath Fig. 1, and each of its different divisions indicates the type of current carried by the vertically alined part in Fig. 1. No attempt has been made in Fig. 3 to indicate relative current values accurately.

In the arrangement shown in Fig. 2, the voltage and current connections for the wattmeter are by a voltage transformer 30 and a current transformer 31. The current transformer 31 supplies the primary of a transformer 32, shown as a step-up transformer. The two transformers 30 and 32 have their terminals connected to the end points of two-group sets of rectifying cells 33 and 34 respectively. Each of said two-group sets of rectifying cells, (well-known per se) has its two groups of cells *e* and *f* connected in opposition, each cell-group permitting current-flow in one direction only between the transformer terminal to which it is connected and the junction point between such two cell-groups, as is indicated by the arrows. Two wires 35 and 36 are connected respectively to such junction point in the set 33 and to the midpoint of the secondary of the transformer 30, and supply the voltage winding of the direct-current wattmeter 11. Similarly, two wires 37 and 38 are connected respectively to such junction point in the set 34 and to the midpoint of the secondary of the transformer 32, and supply the current winding of such direct-current wattmeter. During one half cycle, the upper halves of the secondaries of the transformers 30 and 32 supply current through the upper cell-groups *e* of the sets 33 and 34 to said two pairs of wires 35—36 and 37—38, respectively, while during the other half-cycle the lower halves of the secondaries of such transformers supply current through the lower cell-groups *f* of said sets to said two pairs of wires. In this way, each of such two pairs of wires receives current in one direction only.

In Fig. 2 I have shown electric filters 39 and 40 in both of said two pairs of wires, to smooth out and eliminate intra-cycle pulsations in both currents supplied to the wattmeter windings. These electric filters are slightly different from that shown in Fig. 1; in that each of them has two reactances, 41 and 42, and 43 and 44, connected in the two wires (35 and 36 or 37 and 38) with which that electric filter is connected, and the two condensers 45 and 46, and 47 and 48, of each electric filter cross-connect the ends of the two associated reactances.

With the arrangement of circuits shown in Fig. 2, each of the two windings of the direct-current wattmeter carries a unidirectional current which is substantially free from intra-cycle pulsations, said two currents being substantially proportional to the voltage and to the current respectively of the main alternating-current circuit 10. In consequence, the two currents react in the wattmeter independently of the power factor of the main circuit, and thus give a true volt-ampere measurement.

In Fig. 4 I have indicated diagrammatically the types of currents in the various parts of the wattmeter-supplying circuits of the arrangement shown in Fig. 2. To this end, Fig. 4 is placed directly beneath Fig. 2, and each of its different divisions indicates the type of current carried by the vertically alined part in Fig. 2. As in Fig. 3, no attempt has been made in Fig. 4 to indicate relative current values accurately.

The rectifying cells used, when the rectification is by such cells, may be of any suitable types, of which a number are known. One suitable type consists of a series of copper disks each having on one side only a superficial layer of red oxide of copper, with the disks so placed in the series that the oxidized face on one disk is against the unoxidized face of the next. This type of rectifying cell is found to be quite accurate in letting through substantially in their entirety the half-waves in one direction while holding back substantially in their entirety the half-waves in the other direction; and in addition has the advantage of requiring no electrolyte. While this form of rectifying cell is thus well adapted for my use, my invention contemplates rectification in any suitable manner, and by any suitable means.

I claim as my invention:—

1. The process of measuring the volt-amperes of an alternating-current circuit, comprising deriving two alternating currents from said circuit in substantial proportion to the voltage and current respectively of said circuit, rectifying each of said two derived currents, electric-filtering at least one of said two rectified currents to substantially eliminate its intra-cycle pulsations, and then causing said two rectified currents to react on each other to measure their product.

2. The process of measuring the volt-amperes of an alternating-current circuit, comprising deriving two alternating currents from said circuit in substantial proportion to the voltage and current respectively of said circuit, rectifying each of said two derived currents, electric-filtering both of said two rectified currents to substantially eliminate its intra-cycle pulsations, and then causing said two rectified currents to react on each other to measure their product.

3. The process of measuring the volt-amperes of an alternating-current circuit, comprising deriving two alternating currents from said circuit in substantial proportion to the voltage and current respectively of said circuit, so rectifying each of said derived currents that a widely pulsating unidirectional current is obtained from it, electric-filtering at least one of said two pulsating rectified currents to substantially eliminate its intra-cycle pulsations, and then causing said two rectified currents to react on each other to measure their product.

4. The process of measuring the volt-amperes of an alternating-current circuit, comprising deriving two alternating currents from said circuit in substantial proportion to the voltage and current respectively of said circuit, so rectifying each of said derived currents that a widely pulsating unidirectional current is obtained from it, electric-filtering both of said two pulsating rectified currents to substantially eliminate their intra-cycle pulsations, and then causing said two rectified currents to react on each other to measure their product.

5. An apparatus for measuring the volt-amperes of an alternating current circuit, comprising means for deriving from said circuit two currents substantially proportional to the voltage and to the current of said circuit, means for rectifying each of said two derived currents, an electric filter for at least one of said two rectified currents, and a direct-current wattmeter to whose two windings said two rectified currents are supplied after at least one of them has been passed through such an electric filter.

6. An apparatus for measuring the volt-amperes of an alternating current circuit, comprising means for deriving from said circuit two currents substantially proportional to the voltage and to the current of said circuit, means for rectifying each of said two derived currents, an electric filter for each of said two rectified currents, and a direct-current wattmeter to whose two windings said two rectified and electric-filtered currents are supplied.

7. An apparatus for measuring the volt-amperes of an alternating current circuit, comprising means for deriving from said circuit two currents substantially proportional to the voltage and to the current of said circuit, two static rectifiers to which said two derived alternating currents are supplied to change them into unidirectional currents, an electric filter for at least one of said two rectified currents, and a direct-current wattmeter to whose two windings said two rectified currents are supplied after at least one of them has been passed through such an electric filter.

8. An apparatus for measuring the volt-amperes of an alternating current circuit, comprising means for deriving from said circuit two currents substantially proportional to the voltage and to the current of said circuit, two static rectifiers to which said two derived alternating currents are supplied to change them into unidirectional currents, an electric filter for each of said two rectified currents, and a direct-current wattmeter to whose two windings said two rectified and electric-filtered currents are supplied.

9. An apparatus for measuring the volt-amperes of an alternating current circuit, comprising means for deriving from said circuit two currents substantially proportional to the voltage and to the current of said circuit, a group of rectifying cells to which each of said derived alternating currents is supplied to change it into a unidirectional current having both half-cycles of the alternating current, an electric filter for at least one of said two rectified currents, and a direct-current wattmeter to whose two windings said two rectified currents are supplied after at least one of them has been passed through such an electric filter.

10. An apparatus for measuring the volt-amperes of an alternating current circuit, comprising means for deriving from said circuit two currents substantially proportional to the voltage and to the current of said circuit, a group of rectifying cells to which each of said derived alternating currents is supplied to change it into a unidirectional current having both half-cycles of the alternating current, an electric filter for each of said two rectified currents, and a direct-current wattmeter to whose two windings said two rectified and electric-filtered currents are supplied.

11. An apparatus for measuring the volt-amperes of an alternating current circuit, comprising means for deriving from said circuit two currents substantially proportional to the voltage and to the current of said circuit, a group of rectifying cells to which each of said derived alternating currents is supplied to change it into a unidirectional current, an electric filter for at least one of said two rectified currents, and a direct-current wattmeter to whose two windings said two rectified currents are supplied after at least one of them has been passed through such an electric filter.

12. An apparatus for measuring the volt-amperes of an alternating current circuit, comprising means for deriving from said circuit two currents substantially proportional to the voltage and to the current of said circuit, a group of rectifying cells to which each of said derived alternating currents is supplied to change it into a unidirectional current, an electric filter for each of said two rectified currents, and a direct-current wattmeter to whose two windings said two rectified and electric-filtered currents are supplied.

13. The method of determining the magnitude of the volt-amperes of an alternating-current circuit which comprises maintaining a plurality of alternating currents proportional, respectively, to the current and electro-motive force of said circuit, rectifying said alternating currents, and utilizing said rectified currents to indicate the magnitude of the volt-amperes of said circuit.

14. The method of measuring the volt-amperes in an alternating-current circuit which comprises rectifying a quantity proportional to volts, rectifying a quantity proportional to amperes, and energizing the current and voltage windings, respectively, of a direct-current watthour meter by said rectified quantities.

15. The method of measuring the volt-amperes of an alternating-current circuit which comprises deriving a current proportional to the electro-motive force of said circuit, deriving a current proportional to the current of said circuit, rectifying said currents, and energizing an instrument by said rectified currents.

16. The combination with an alternating-current circuit, of means for measuring the volt-amperes of said circuit comprising a copper-oxide rectifier for obtaining a current proportional to the electro-motive force of said current, means, including a copper oxide rectifier, for obtaining a current proportional to the current in said circuit, and means, including a meter responsive to said rectified currents, for performing an integrating function.

17. A system for measuring the volt-amperes of an alternating-current circuit comprising means for producing a plurality of alternating currents proportional, respectively, to said volts and amperes, means for rectifying said alternating currents, and means, including a direct-current instrument, for utilizing said quantities.

18. A system for measuring the volt-amperes of an alternating-current circuit comprising means, including a copper-oxide rectifier, in circuit relation with a circuit traversed by a current proportional to the voltage of said circuit, means, including a copper-oxide rectifier, in circuit relation with a circuit traversed by a current proportional to the current traversing said circuit, and a direct-current watthour meter having current and voltage coils energized, respectively, by the currents traversing said copper-oxide rectifiers.

19. Apparatus for measuring the volt-amperes in an alternating-current circuit comprising a direct-current meter, and means for producing a torque in said meter substantially in accordance with the volt-amperes in said circuit comprising copper-oxide rectifiers in circuit relationship with said meter, said rectifiers rectifying alternating currents maintained proportional to the volts and amperes of said circuit.

In witness whereof, I have hereunto set my hand at Indianapolis, Indiana, this 31st day of October, A. D. one thousand nine hundred and twenty-seven.

DONALD J. ANGUS.